April 18, 1933.  R. E. BARCLAY  1,904,348
METHOD OF MAKING MULTIBORE TUBES
Filed Aug. 5, 1931  2 Sheets-Sheet 1
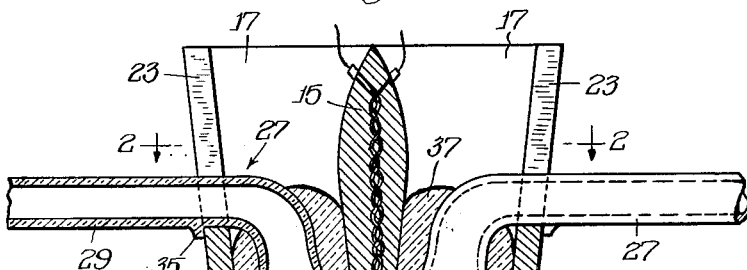
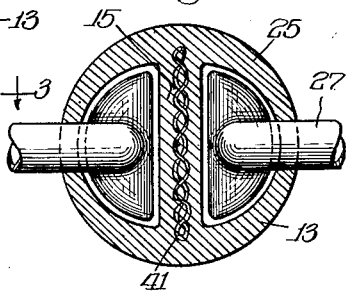
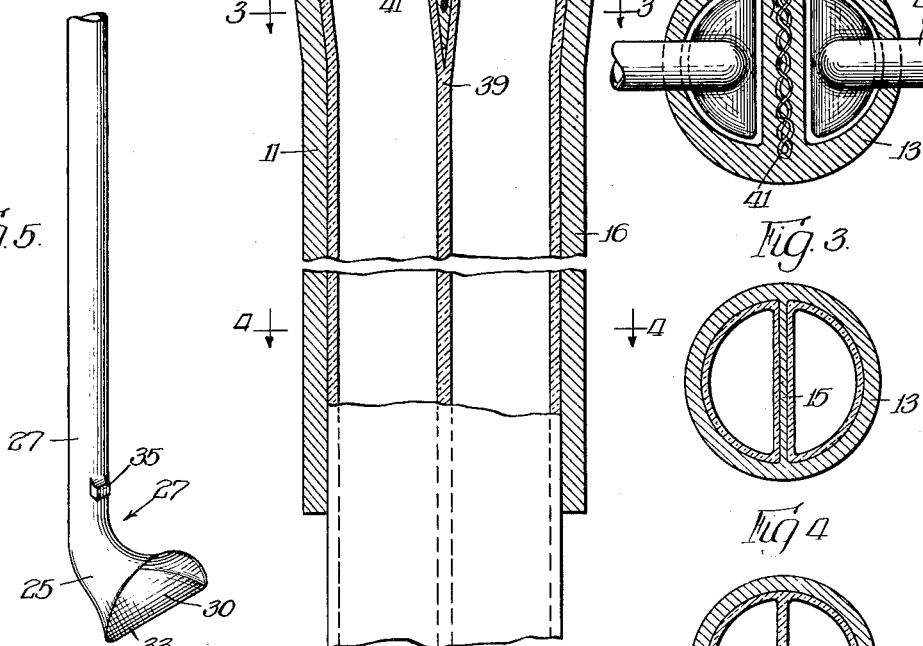
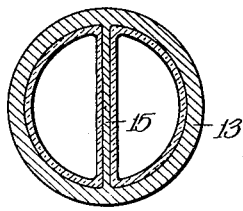
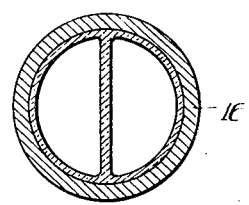
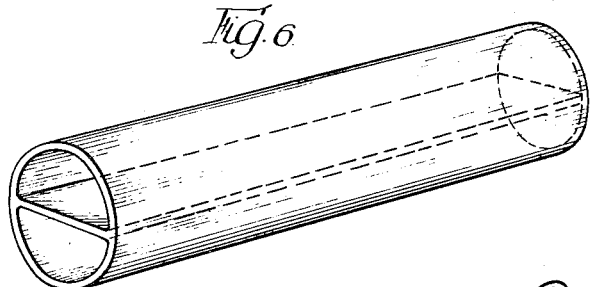
Inventor:
Robert E. Barclay
By: Cheever, Cox & Moore
attys

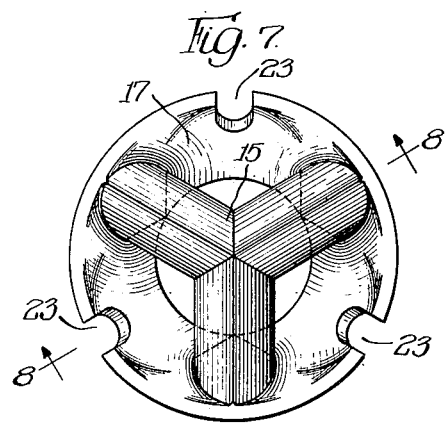
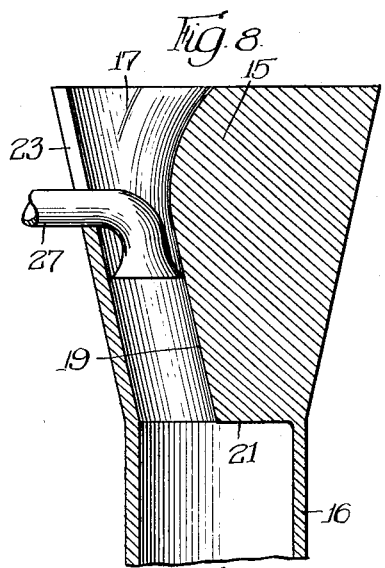
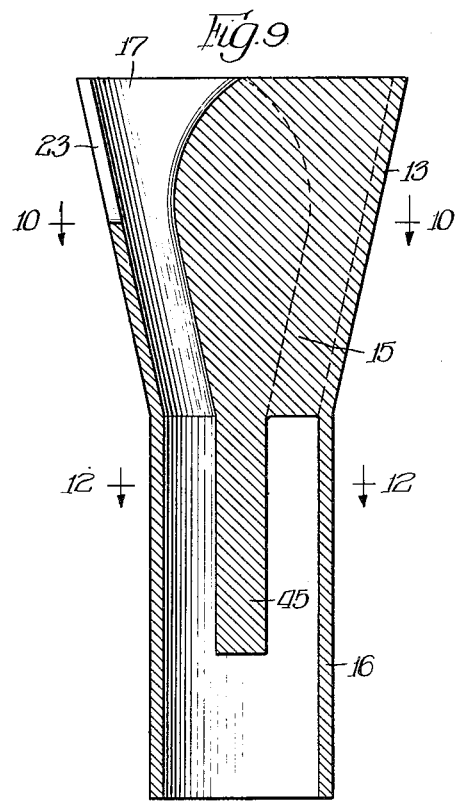
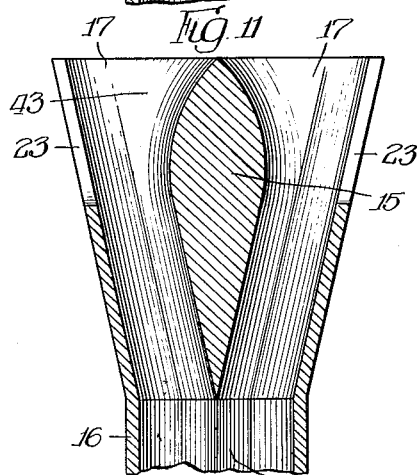
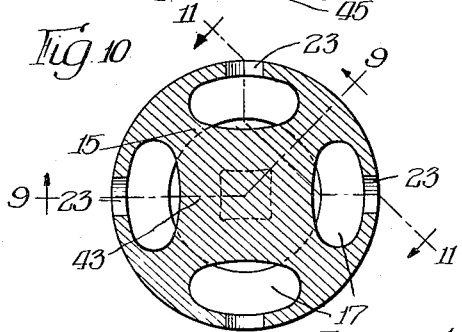
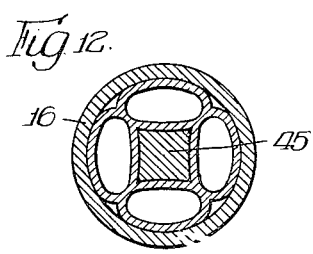
Inventor:
Robert E. Barclay,
By: Cheever, Cox & Moon
attys Patented Apr. 18, 1933

1,904,348

UNITED STATES PATENT OFFICE

ROBERT E. BARCLAY, OF CHICAGO, ILLINOIS, ASSIGNOR TO FEDERAL ELECTRIC COMPANY, OF CHICAGO, ILLINOIS, A CORPORATION OF NEW YORK

METHOD OF MAKING MULTIBORE TUBES

Application filed August 5, 1931. Serial No. 555,244.

My invention relates in general to the manufacture of glass tubing and has more particular reference to means for and method of making an integral multi-channel tubing and the resulting product having a number of useful applications more especially in the discharge arc field, the tubing being especially adapted for use in discharge arc illuminating devices as set forth in my co-pending application, Serial Number 491,404, filed October 27, 1930. My present invention more particularly relates to a novel method and apparatus for producing a continuous tube having integral partition means dividing a tube into a plurality of channels or bores.

In the manufacture of an article of this general character, it is especially desirable to have the tube produced in a continuous manner and with uniform cross-sectional configuration and size throughout its length.

An important object of my invention therefore is to provide means for and a method of making multi-channel tubing, that is to say, a tube having longitudinally extending partition means defining a plurality of parallel and adjacent channels longitudinally of the tube.

Another important object is to provide means for and a method of making multichannel tubing having a uniform cross-sectional configuration throughout its length.

Another object is to produce tubing of the class described having partition means formed integrally during the formation of the tube from the molten work material.

Another important object is to provide a method of producing tubing of the class described, said method being capable of producing tubing having any desired number of adjacent channels of a desired configuration.

Another important object of the invention is to produce tubing of the class described in a continuous manner.

Another object is to provide a die in which the work material may be blown to produce tubing of the character described.

Another object is to provide a die having a partitioned portion in which tubes may be formed and an adjacent portion without partitions into which the tubes may be moved while partitions into which the tubes may be moved while the material thereof is yet plastic enough to permit them to flow together at the points of contact whereby to produce multi-channel tubing in a uniform and continuous manner.

Numerous other objects and advantages will be apparent as the same is more fully understood from the following description, which, taken in connection with the accompanying drawings, discloses a preferred embodiment of my invention.

Referring to the drawings:

Figure 1 is a vertical section through a die embodying my invention and illustrating the manner of producing multi-channel tubing in accordance with the teachings of my present disclosure;

Figures 2, 3 and 4 are horizontal sections taken respectively along the lines 2—2, 3—3 and 4—4 in Figure 1;

Figure 5 is a perspective view of a blowing instrument forming a part of the apparatus embodying my present invention;

Figure 6 is a perspective view of a double-bore tube section produced in the device shown in Figure 1;

Figure 7 is a top-plan view of a die of the type illustrated in Figure 1, but modified to produce a triple-bore tube;

Figure 8 is a vertical section taken substantially along the line 8—8 in Figure 7;

Figure 9 is a vertical section taken substantially along the line 9—9 in Figure 10;

Figure 10 is a horizontal section taken along the line 10—10 in Figure 9 to illustrate a die of the same general type as that illustrated in Figure 1, but modified to produce a special type of multi-channel tubing providing a plurality of oval bores arranged substantially circularly around a central, substantially square, bore;

Figure 11 is a vertical section taken substantially along the line 11—11 in Figure 10; and Figure 12 is a horizontal section taken substantially along the line 12—12 in Figure 9.

To illustrate my invention, I have shown on the drawings, a die 11 into and through which glass or other suitable work material may be drawn in order to produce a multi-bore tube. The die 11 comprises a substantially cylindrical member of cast iron, steel or other suitable material, having an upper flared portion 13, and a lower portion 16, the inner walls of which have a cross-sectional configuration (circular in the illustrated embodiment) which it is desired to impart to the finished product. The upper flared portion 13 is provided with a partition means 15, which divides the bore of the upper die portion into a plurality of channels 17, (in Figures 1 through 4, two channels are provided; in Figures 7 and 8, three channels are provided; and in Figures 9 through 12, four channels are provided in the upper portion of the die).

The lower portions of the partition 15 have inwardly tapering sides 19, which meet and terminate on a preferably horizontal line 21 at or approximately opposite the junction of the flared upper portion and the cylindrical lower portion 15. The sloping walls 19 also have a slope corresponding to the inclination of the flared walls of the portion 13 so that the channels 17, at all points along the sloping surfaces 19 of the partition 15, have substantially the same horizontal cross-sectional arrangement and configuration.

The outer upper walls of the die are or may be provided with notches or slots 23, each notch being located preferably centrally with respect to a channel 17 so that the formed end 25 of the glass blowing instrument 27 may be removably positioned in each channel 17 with its shank 29 extended out of the die through the slot 23. The glass blowing instrument 27 preferably comprises a flared or bell shaped mouth 31, the peripheral edges 33 of which preferably conform with the shape of the channel 17 so that when arranged in position therein, the edges 33 will be spaced from the inner surface of the bore 17 a distance substantially equal to the desired thickness of the material desired in the walls of the finished product. The shank of the blowing instrument is or may be provided with a stop 35 adapted to engage the outer surface of the die at the bottom of the slot 23 to assist in positioning the mouth of the blowing instrument in aligned position in the channel 17.

In making multi-bore tubing, as many blowing instruments 29 are employed as there are channels in the die. The end of each instrument 27 is dipped into the bath of molten glass or is otherwise provided with a globule 37 of the molten work material which is to be blown into the desired tubular form, each blowing tube 27 being handled preferably by a separate operator. The end of each tube is then positioned in a channel 17 until all channels are provided with blowing instruments having each a globule of molten glass. Air pressure is then applied to the outer end of each tube, the air pressure being supplied either by means of compressed air or by the operator blowing into the end of the tube in the time honored manner. In this way, the glass is blown out into tubular form in each channel 17 and passes downwardly to the point in which the partition, separating the channels 17, terminates, at which point, the several tubes of glass thus produced meet and engage along their contacting surfaces. The glass at this point is still in a semi-molten or semi-fluid state so that the contacting surfaces of the several tubes flow together as indicated at 39.

In order to maintain the glass in a fluid condition so as to ensure the flowing together process, I may provide the lower portion of the partition 15 with any suitable heating means 41 such as the electrical heater illustrated as embedded in the partition. By so heating the partition, the walls of the several tubes, which engage and flow together at 39 are maintained hot and plastic during their passage downwardly along the surface 19 of the partition.

After meeting and joining at the point 19, the several connecting tubes travel downwardly through the lower straight sided portion 16 of the die gradually cooling and solidifying as the bottom of the die is approached, so that when the product finally emerges at the lower end of the die, it is a solid integral element having a longitudinal partition comprising the joined sides of the individual tubes which meet and fuse at the point 39. If desired, the downward travel of the hardening product may be facilitated and controlled by stationing a workman or arranging other means at the discharge end of the die to grasp or receive the outwardly moving portion of the tube and draw it out through the die at a suitable rate to assist in the removal of the finished product.

My invention contemplates also the possibility of continuously replenishing the globules of glass 37 as the same are blown through the channels 17 by adding additional glass in molten state through the upper ends of the channels 17. This may be accomplished by ladle-provided operators, who will pour in additional glass as it is needed, or by providing a channel leading directly from the glass formation.

Where it is desired to have, in the finished product, several channels arranged circularly around a central bore, a die, such as is illustrated in Figures 9 through 12, is utilized. In this embodiment, the individual tubes are produced in the channels 17, which are arranged circularly, in the upper flared portion of the die, around a central core 43 of substantial portions and having configuration substantially conforming to the cross-sectional shape of the central bore of the finished tube. The partition means 15, separating the adjacent sides of the several channels, tapers downwardly and inwardly as in the die illustrated in Figures 1 through 8, so that the tubes produced in the several channels 17 flow together laterally at the lower terminal edge of the partition 15. The central core 43, however, is continued downwardly as at 45 to supply internal support for the joined tubes until the same becomes hardened enough to be self-sustaining. To this end, the extension 45 may be continued downwardly in the die as far as necessary and may even extend below the die although the same is illustrated as terminating within the lower straight-sided portion 15 substantially above the lower end of the die.

My invention provides a rather simple and easily operated continuous method of making multi-bore tubes, which are particularly well adapted for use in electrical discharge arc illumination and for other purposes. The tubing, by the method of my present invention, is produced continuously and directly from the molten work material and therefore provides considerable economy. Much more so than where tubing of the character described is made discontinuously as by working with previously formed lengths of tubing.

My present invention permits all parts of the tube to be made of material which cools and sets uniformly and at substantially the same instant at any given point in the length of the product. Reheating of the tube with consequent distortion is avoided and the resulting product has a uniformity of wall thickness which is impossible where the tubing is made discontinuously.

It is thought that the invention and numerous of its attendant advantages will be understood from the foregoing description and it is obvious that numerous changes may be made in the form, construction and arrangement of the several parts without departing from the spirit or scope of my invention or sacrificing any of its attendant advantages, the forms herein described being preferred embodiments for the purpose of illustrating my invention.

Having thus described my invention, what I claim as new and desire to secure by Letters Patent, is as follows:

1. The method of making multi-bore tubing, which comprises forming a plurality of tubes, feeding the tubes so formed together at a common point while in fluid condition whereby the contacting surfaces of the tubes fuse together.

2. The method of making multi-core tubing, which comprises forming a plurality of tubes, feeding the tubes so formed progressively together at a common point while in fluid condition whereby the contacting surfaces of the tubes fuse together.

3. The method of making multi-bore tubing, which consists in continuously forming a plurality of tubes and bringing the tubes together progressively while the material thereof is sufficiently fluid to permit fusion and then permitting the fused tubes to cool gradually.

4. Apparatus for producing multi-channeled tubing comprising means forming converging channels, and means for forming and transferring tubes in said channels whereby said several tubes in traveling the channels to the point of convergence thereof will meet and fuse together to form an integral member having a plurality of longitudinal channels therein.

5. Apparatus for producing multi-channeled tubing comprising means forming converging channels, and means for feeding formed tubes through said channels and means for maintaining the adjacent walls of the said tubes in plastic condition as they travel the channels to the point of convergence thereof.

6. Apparatus as set forth in claim 5 wherein the channels are separated by common partition means and the several tubes receive heat from the partition means in traveling there along to the point of convergence.

7. The method of making multi-bore glass tubing, which consists in feeding pre-formed tubes into lateral contact while maintaining the tubes in a plastic condition sufficient to permit fusion of the glass at the points of contact.

8. The method of making multi-bore glass tubing, which consists in feeding pre-formed tubes into lateral contact while maintaining each tube, at any given point in its length, at substantially the same degree of plasticity throughout its circumference and simultaneously maintaining the fluidity of the several tubes substantially equal at the point of contact.

9. The method of making multi-bore tubing which consists in feeding pre-formed tubes into lateral contact while maintaining the contacting sides of the tubes in sufficiently plastic condition to permit fusion of the tubes at the points of contact.

10. Apparatus for producing multi-channeled tubing comprising means forming converging channels, and means for forming the tubes and feeding the formed tubes through said channels toward a point of convergence, and means for maintaining the walls of said tubes in plastic condition as they travel the channels to the point of convergence.

In witness whereof, I have hereunto subscribed my name.

ROBERT E. BARCLAY.